Patented July 5, 1949

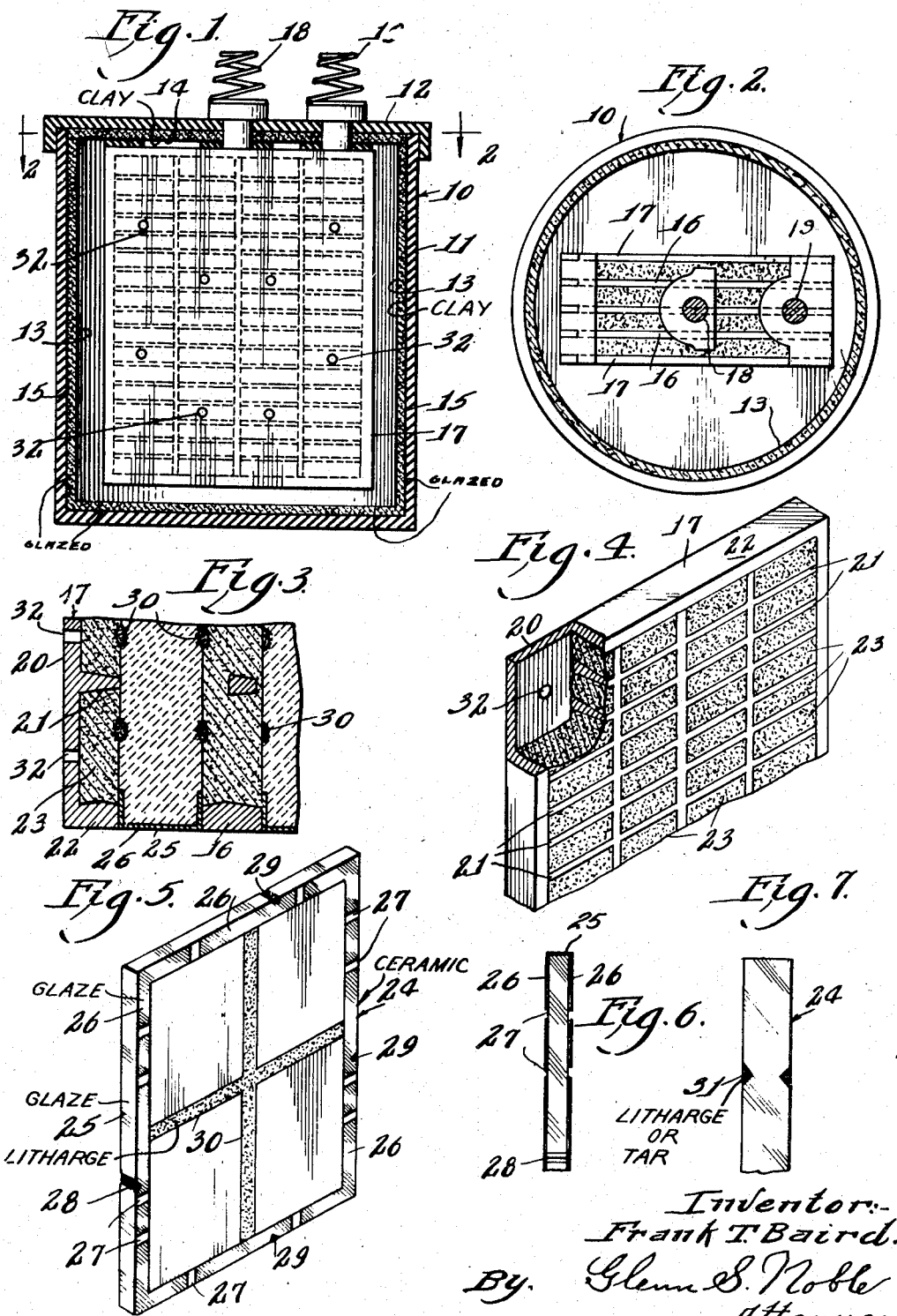

2,475,538

UNITED STATES PATENT OFFICE 2,475,538

STORAGE BATTERY WITH REFRACTORY SEPARATOR

Frank T. Baird, Chicago, Ill.

Application July 24, 1946, Serial No. 685,998

1 Claim. (Cl. 136—146)

This invention relates to storage batteries of the "dry" type; that is, batteries of the kind in which the electrolyte is substantially all contained or held in absorbent plates or separators interposed between the active battery plates or electrodes. I have found that in the use of batteries of this kind, particularly for electric lanterns, there may be some discharge of vapors or gases which is objectionable if permitted to escape from the battery box.

One of the novel features of the present invention is the provision of a battery box made principally or wholly of absorbent plates which will take up or absorb such free liquid or gases; or the provision of a battery box with a lining which will accomplish such purposes.

When such batteries are used in electric lamps, the plates are usually in a vertical position and there is a tendency for the electrolyte absorbed by the separator plates to run down or move by gravity to the lower portions of the plates with a consequent tendency to leave the upper portions without sufficient electrolyte to operate properly in such upper areas.

Another of the novel features of the present invention is the provision of such separators that will tend to hold the electrolyte in predetermined areas and prevent or minimize the downward movement of the same. Another advantage of the present separators is the glazing or rendering of the peripheries of the same so that they are non-absorbent, or in other words, so that all the electrolyte would tend to be held in the respective separators.

Another novel feature of the present invention is the particular construction of the first and last, or end electrodes with solid outer metallic surfaces to prevent escape of the electrolyte or evaporation of the same from the sides of the battery or breaking away of the litharge.

These novel features and other advantages and improvements will be described more fully hereinafter in connection with the accompanying drawing in which, Fig. 1 is a vertical sectional view of a preferred form of my improved battery;

Fig. 2 is a horizontal sectional view taken substantially on the line 2—2 of Fig. 1;

Fig. 3 is an enlarged sectional detail of the assembled battery members;

Fig. 4 is a perspective view with parts broken away illustrating the formation of the outer electrodes or battery plates;

Fig. 5 is a perspective showing one form of the separators or absorbent plates; and Figs. 6 and 7 are detail views of the separators.

As shown in Figs. 1 and 2, the battery cell or box 10 consists of an outer receptacle 11 formed of any suitable material and provided with a cover 12. It also has an inner lining or receptacle 13 which is formed of any suitable porous material which will absorb gases from the battery but which will not be affected by such gases or any free electrolyte which may also be absorbed thereby. I have found that materials such as tripoli may be useful for this purpose, but I prefer to use absorbent refractories such as may be compounded of various materials, china clays, ball clays, or the like, and which refractories are now in common use for other purposes. The cover 12 is also lined with the same material as shown at 14. The entire outer surfaces of the lining are glazed as indicated at 15 to prevent the electrolyte or gases from escaping therefrom. In some instances, the outer casing or box 11 may be omitted and the entire cell constructed of such glazed absorbent material which will take up any gases or stray electrolyte and prevent its being discharged from the cell.

In the present form of the device, the positive electrodes 16 and negative electrodes 17 are formed on grids or may be made of any desired construction. The positive electrodes or plates 16 are connected with a terminal 18 and the negative plates or electrodes are connected with the terminal 19. The outermost grid members are preferably formed with solid plate portions 20 with holes 32 therethrough, and with inwardly projecting ribs 21 and peripheral flanges 22 for holding the active coating 23 which may consist of litharge or other suitable paste such as used in the manufacture of storage batteries. The intermediate negative plates are made in the usual manner.

The separators or absorbent plates 24 which are interposed between the battery electrodes or plates 16 and 17 constitute one of the most essential features of the present invention. These plates are formed of suitable absorbent or foraminous material and preferably of refractories which are compounded of various ingredients and manufactured particularly for the present purposes. These plates may be of any suitable size or thickness, but for ordinary hand lanterns, I have made them about one-eighth of an inch in thickness. As shown particularly in Figs. 5 and 6, the plates are glazed around their edges or peripheries as shown at 25 and also for a short distance around the adjacent faces on either side as indicated at 26. These glazed peripheral portions will tend to hold the electrolyte within the separators for an increased length of time. If desired, the glazing on the surfaces may be omitted for short spaces as shown at 27 to provide vents or passageways for the electrolyte to pass into the interior parts of the separators and to permit the escape of gases from the separators.

The edges of the separators may be indented or notched as shown at 28 and such notches filled with litharge paste or other suitable material 29 to further effect the ready absorption of the electrolyte when the separators are being charged but such filling should not contact the adjacent plates when in the battery.

The separators are also provided with means to retard or reduce the flow of the electrolyte from one portion thereof to another portion. The plates may be divided into as many of such sections as desired, but in the present instance, I have shown them divided into four sections, these sections being bounded by the retarding means which may consist of bands of litharge as shown at 30. This paste may be applied to the surface and a certain amount thereof will penetrate the porous plate, thereby tending to form a stop or barrier to prevent the electrolyte from passing from the upper sections to the adjacent lower sections. In some instances I may provide grooves 31 in the opposite faces of the plate and fill these grooves with litharge paste or sealing material such as tar, or the like, as used in battery construction. These filled indentations will more effectively serve to hold the electrolyte in its intial sections and thus tend to prevent the downward movement of the electrolyte which is otherwise apt to occur particularly when the lantern is standing for any considerable length of time.

While I have shown and described a preferred form of my improved battery, it will be noted that changes may be made in the construction thereof in order to adapt the same for various purposes, without departing from the scope of the invention as set forth in the following claim:

In a storage battery, the combination of a plurality of positive plates and negative plates, separators formed of absorbent refractory material fitting between the plates and closely engaging therewith, an electrolyte coacting with the plates, substantially all of said electrolyte being carried in the separators, each of said separators having glazed peripheral portions to retain the electrolyte and each plate being divided into a plurality of sections by means of bands of litharge on the surface and extending into the plate a short distance, the arrangement being such that said bands will tend to prevent the electrolyte from passing too quickly from one section to another.

FRANK T. BAIRD.

REFERENCES CITED

The following references are of record in the file of this patent:

UNITED STATES PATENTS

| Number | Name | Date |
|---|---|---|
| Re. 15,067 | Baird | Mar. 22, 1921 |
| 266,798 | Faure | Oct. 31, 1882 |
| 491,726 | Macleod | Feb. 14, 1893 |
| 717,549 | Decker et al. | Jan. 6, 1903 |
| 895,732 | Decker | Aug. 11, 1908 |
| 1,285,303 | Mentzer | Nov. 19, 1918 |
| 1,890,178 | Heise et al. | Dec. 6, 1932 |
| 2,120,822 | Wheat | June 14, 1938 |
| 2,151,667 | Snyder | Mar. 21, 1939 |
| 2,223,408 | Dietert | Dec. 3, 1940 |
| 2,428,470 | Powers | Oct. 7, 1947 |

OTHER REFERENCES

Merwin, H. E. J. Ind. & Eng. Chem., vol 9 (1917), p 390